(12) United States Patent
Chen

(10) Patent No.: US 6,279,241 B1
(45) Date of Patent: Aug. 28, 2001

(54) THICKNESS GAUGE

(75) Inventor: Shen-Jen Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/347,944

(22) Filed: Jul. 6, 1999

(30) Foreign Application Priority Data

Mar. 3, 1999 (CN) .............................................. 8820331 U

(51) Int. Cl.⁷ .............................. G01B 3/50; G01B 3/36
(52) U.S. Cl. .................... 33/501.45; 33/199 R; 33/509
(58) Field of Search ........................... 33/501.08, 501.09, 33/501.45, 531, 199 R

(56) References Cited

U.S. PATENT DOCUMENTS

| | | | | |
|---|---|---|---|---|
| 318,051 | * | 1/1885 | Starrett | 33/199 R |
| 552,238 | * | 12/1895 | Darling | 33/199 R |
| 590,486 | * | 8/1897 | Sawyer | 33/199 R |
| 867,011 | * | 9/1907 | Bromley | 33/501 |
| 987,703 | * | 3/1911 | Curtin | 33/199 R |
| 4,517,747 | * | 5/1985 | Morin | 33/679.1 |
| 5,471,757 | * | 12/1995 | McDonald | 33/501.45 |
| 5,665,973 | * | 9/1997 | Christenson | 33/501.45 |
| 5,875,558 | * | 3/1999 | Bakke et al. | 33/501.45 |

\* cited by examiner

*Primary Examiner*—Diego Gutierrez
(74) *Attorney, Agent, or Firm*—Kenyon & Kenyon

(57) ABSTRACT

The present invention relates to a thickness gauge which comprises a plurality of metallic sheets made to have standard thickness, a U-shaped frame and a screw which adjusts tightness of the metallic sheets. The present invention is characterized in that each metallic sheet comprises a hole and that the hole positions of any two neighboring metallic sheets are different; when two or more pieces of metallic sheets overlap, the holes of the metallic sheets will be shielded by other metallic sheet and human eyes can not see through the holes. In another preferred embodiment, the thickness gauge is characterized in that there is a cut at each metallic sheet. Whereby users can distinguish clearly and conveniently one metallic sheet from several metallic sheets overlapping together and could avoid misuse and measurement errors.

1 Claim, 3 Drawing Sheets

THICKNESS GAUGE

BACKGROUND OF THE INVENTION

1. Field of Invention

The present invention relates to a thickness gauge and, more specifically, relates to an improvement on the standard metallic sheet of a thickness gauge, which improves the conventional thickness gauge and avoids measurement errors resulted from overlaying the metallic sheets of a thickness gauge.

2. Description of the Related Art

Thickness gauges have been widely utilized in the mechanical industry and are mainly utilized to check the gap between mechanical parts, for example, the gap between electrodes of a common engine spark plug and gap between rotor and stator of an electric motor. The thickness gauge is a necessary measurement tool in a mechanical factory. The measurement results are adopted to adjust various components and always influence the operation of the whole machinery. The measurement accuracy for a thickness gauge plays an important role in the industry.

There is a common experience for those who have ever used a thickness gauge. That is, two or three pieces of metallic sheet would overlap when using the thickness gauge, especially for those made to have thickness under 0.1 mm. This is because human eyes hardly distinguish such thin and soft standard metallic sheets for one, two or three sheets. For example, human can not tell 0.03 mm from 0.07 mm. Thus, a metallic sheet of 0.03 mm overlaying a metallic sheet of 0.04 mm is usually regarded as a metallic sheet of 0.03 mm. Since two overlapping metallic sheets are often mistaken as one, the measurement results are obviously wrong.

SUMMARY OF THE INVENTION

An object of the present invention is to provide a novel and practical thickness gauge which could effectively help users to identify clearly and conveniently the gap between metallic sheets and avoid the use of overlapping standard metallic sheets.

Another object of the present invention is to provide a novel and practical thickness gauge which ensures the accuracy of measurement results without misuse.

To avoid the above disadvantages and achieve the objects mentioned above, the present invention discloses a novel thickness gauge which comprises a hole at each metallic sheet made to have standard thickness. The hole positions of neighboring metallic sheets are different and not overlaying, whereby the metallic sheet of the thickness gauge should be expanded to single one when using any metallic sheets made to have standard thickness. The hole on a metallic sheet could be seen through when only the metallic sheet is expanded. When two or more pieces of metallic sheets overlap, the hole on any sheet will be covered by neighboring metallic sheet and can not be seen through. This avoids such mistakes that two or more metallic sheets are mistaken as one.

In the following the present invention will be elucidated with reference to the accompanying Drawings which, however, are being presented for illustrative purpose.

DETAILED DESCRIPTION OF THE PREFERRED EMBODIMENTS

Figure 1:
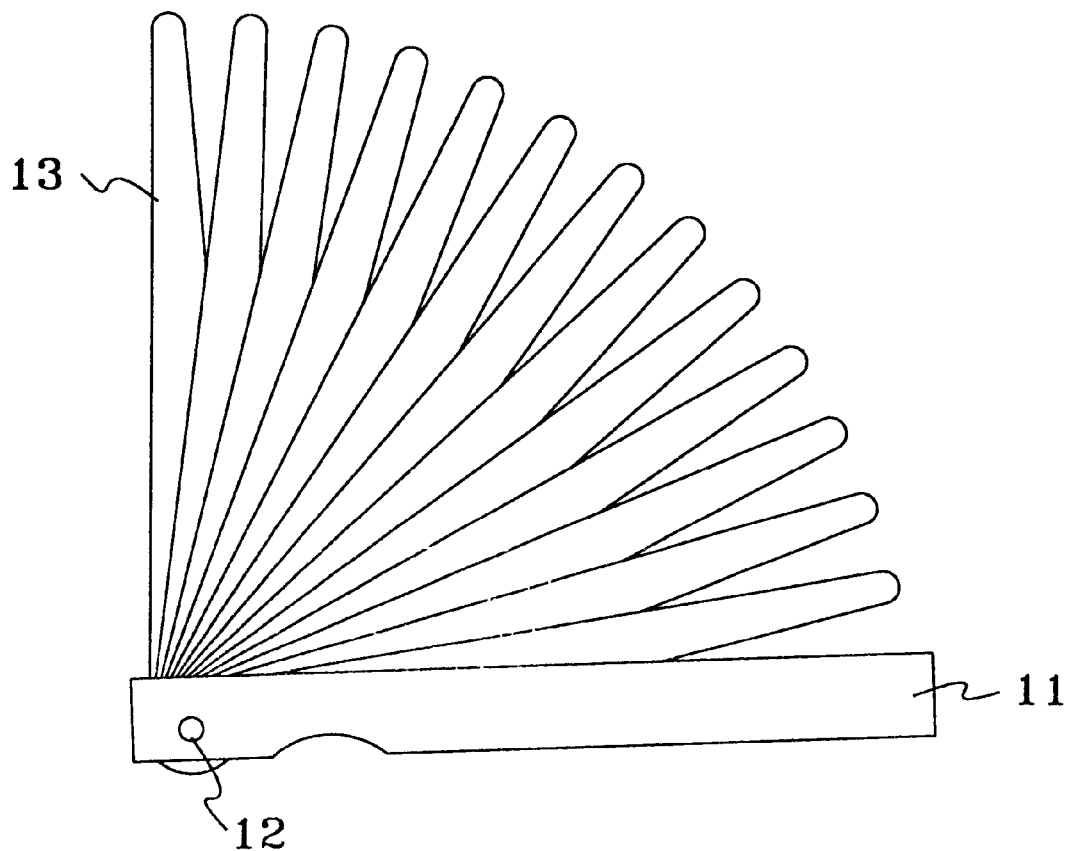
FIG. 1 depicts an expanded conventional thickness gauge.

FIG. 1 shows an expanded conventional thickness gauge. Each metallic sheets made to have standard thickness of the gauge has the same configuration for being collected into the U-shaped frame 11. The metallic sheet is fixed into the frame by a screw 12 with a knob at one end. The tightness of the screw 12 could be adjusted by the knob. The screw 12 could be loosened in order to expand the metallic sheet 13 made to have standard thickness for convenience when using the gauge; on the other hand, the screw 12 could be tightened after finishing measurement when the metallic sheet 13 are incorporated into the U-shaped frame 11 in order to prevent the metallic sheet 13 from slipping out of the frame.

Two or more overlapping metallic sheets are hardly discovered by human eyes, especially for those thin metallic sheet, because each metallic sheet 13 holds the same configuration. It is hard for human eyes to tell one metallic sheet from two or more metallic sheet and this is a main disadvantage of the conventional thickness gauge.

In order to avoid the disadvantages of the conventional thickness gauge, the present invention discloses a thickness gauge, comprising a plurality of metallic sheets, each having a hole at one end and a U-shaped frame, having a screw perforating the frame at the frame opening, wherein the screw also perforates the hole of each metallic sheet and thus fixes the metallic sheets to the frame; and is characterized in that there is another hole at each metallic sheet, and the hole positions of neighboring metallic sheets are different; when two or more metallic sheets are overlaid, any holes of the metallic sheets will be shielded by the other metallic sheet and human eyes can not see through the holes. In another preferred embodiment, the thickness gauge is characterized in that there is a cut at each metallic sheet.

Figure 2:
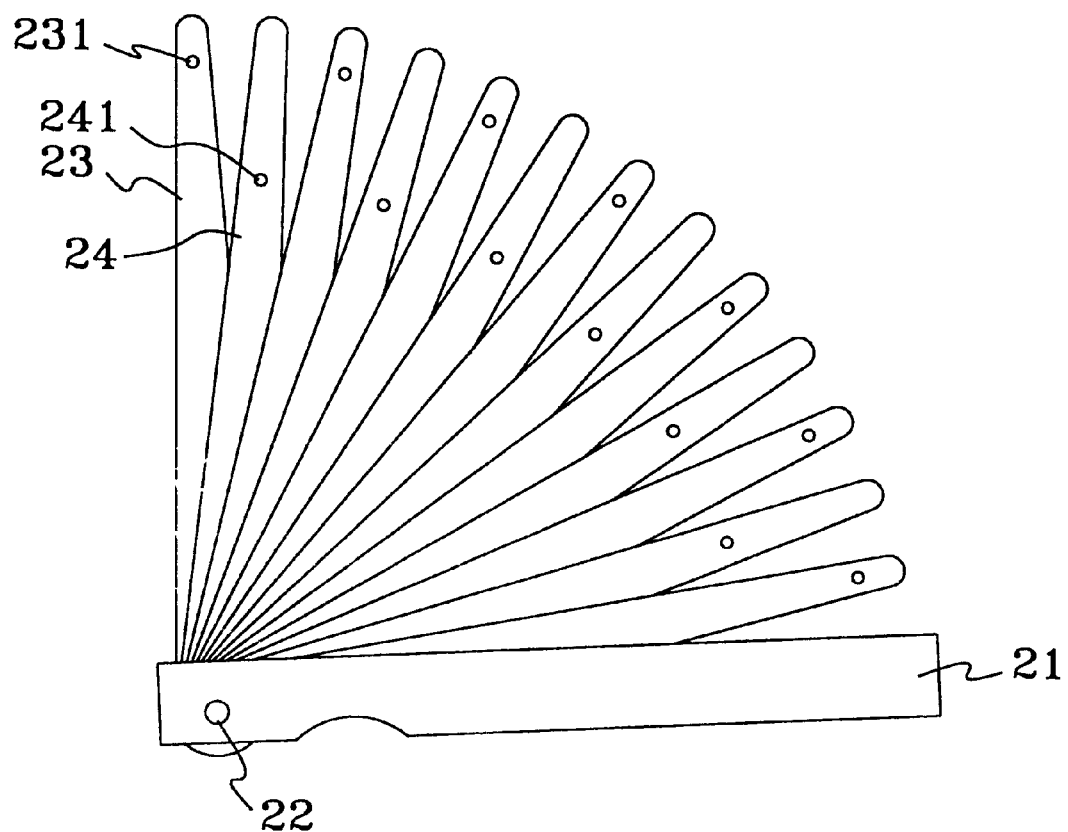
FIG. 2 depicts an expanded thickness gauge according to the present invention.

FIG. 2 shows an embodiment of the present invention. The hole position of each metallic sheet is different. When two or more metallic sheets overlay each other, holes will be shieldeded by neighboring metallic sheet. For example, when metallic sheet 23 overlays metallic sheet 24, hole 231 will be shielded by metallic sheet 24 and hole 241 will be also shielded by metallic sheet 23. This results in that hole 231 and hole 241 can not be seen through. Metallic sheets 23 and 24 should be expanded so that the holes can be seen through when utilizing the gauge. This way ensures correct usage of the gauge and correct measurement results. The present invention could thoroughly solve the problems of overlapping metallic sheet 23 and 24 involuntarily and could prevent the measurement errors from occurring.

Accordingly, any neighboring metallic sheets will not overlap each other according to the invention. As to those not neighboring each other, overlap seldom occurs because another one metallic sheet is located there-between. Even though under critical circumstances, such as that the overlap of two metallic sheets which are not neighboring each other occurs, the measurement errors could be avoided according to the present invention.

Figure 3:
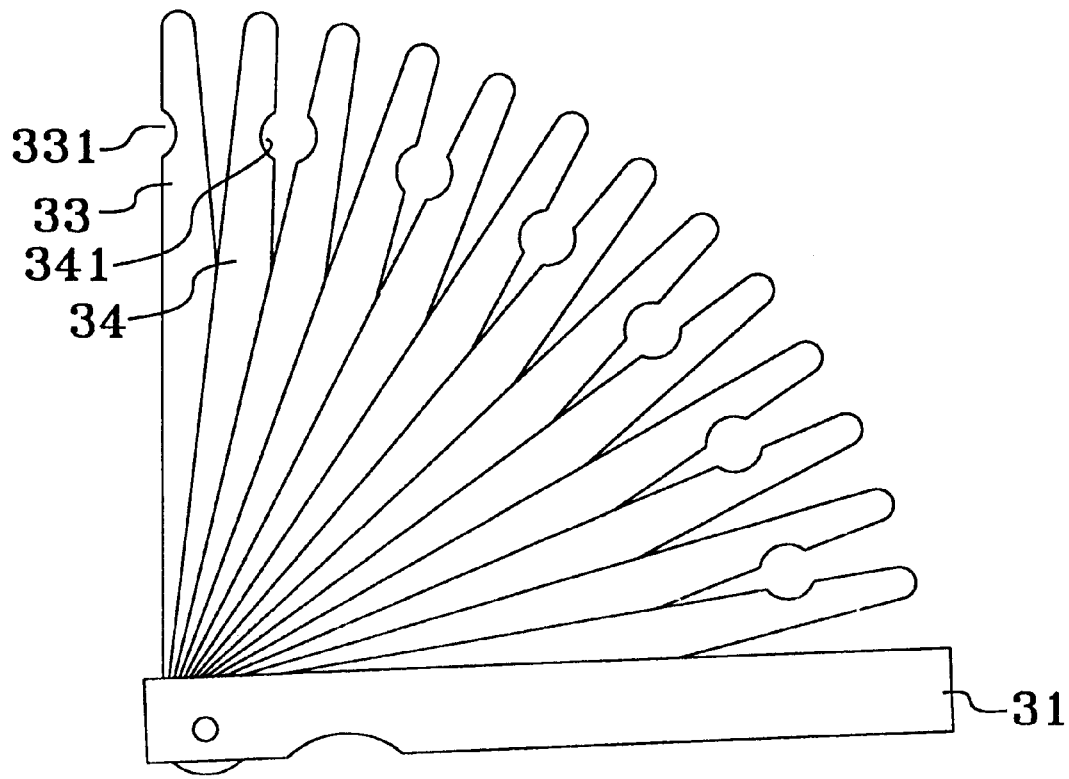
FIG. 3 depicts another preferred embodiment of the present invention.

FIG. 3 depicts another preferred embodiment of the present invention. Each metallic sheet of the thickness gauge 31 comprises a cut; metallic sheet 33 includes a cut 331 and metallic sheet 34 includes a cut 341. Wherein the cut positions for any two neighboring metallic sheets are different; the cut 331 and the cut 341 are different in positions. Thus, when two or more metallic sheets overlap, the cuts of the metallic sheets will be shielded by other metallic sheet; for example, when the metallic sheets 33 and 34 overlap, the cut 331 will be shielded by the metallic sheet 34 and the cut 341 by the metallic sheet 33. Therefore, human eyes can not see through the cuts.

This invention is in no way limited to the example described herein above. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. A thickness gauge, comprising:
    a plurality of metallic sheets, each having a hole at one end thereof;
    a U-shaped frame, having a screw perforating therethrough at an opening of the frame, wherein the screw also perforates the holes of the plurality of metallic sheets and thus fixes the metallic sheets to the frame;
    each of the plurality of metallic sheets further having another hole at a second end thereof, wherein the another hole positions for any two neighboring metallic sheets are different; so that when at least two neighboring metallic sheets of the plurality of metallic sheets overlap, the another hole of one of the at least two neighboring metallic sheets will be shielded by the other of the at least two metallic sheet and human eyes can not see through the another holes of said at least two metallic sheets.

* * * * *